Oct. 20, 1925.
E. W. DAVIS
LUBRICANT COMPRESSOR
Filed May 6, 1921 2 Sheets-Sheet 1
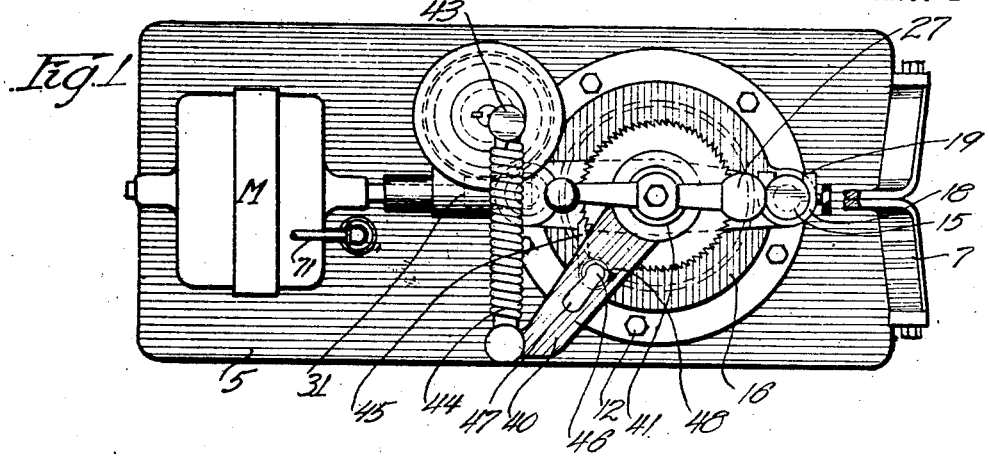
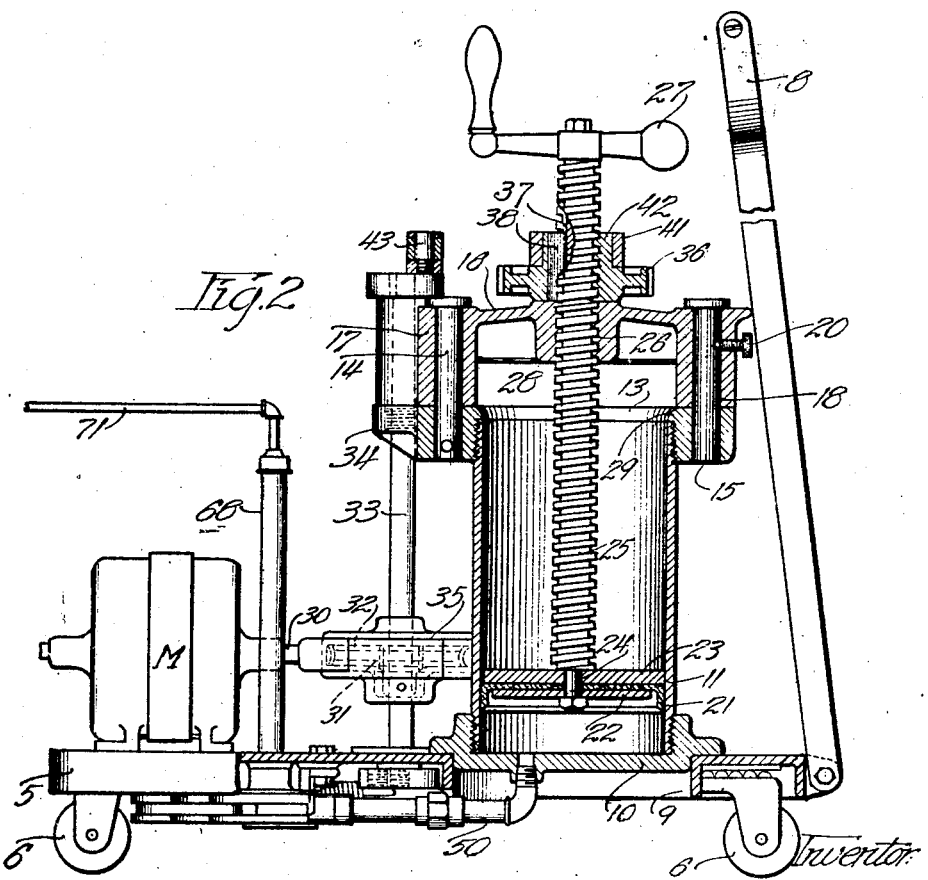
Inventor
Ernest W. Davis Oct. 20, 1925.
E. W. DAVIS
LUBRICANT COMPRESSOR
Filed May 6, 1921
1,558,244
2 Sheets-Sheet 2
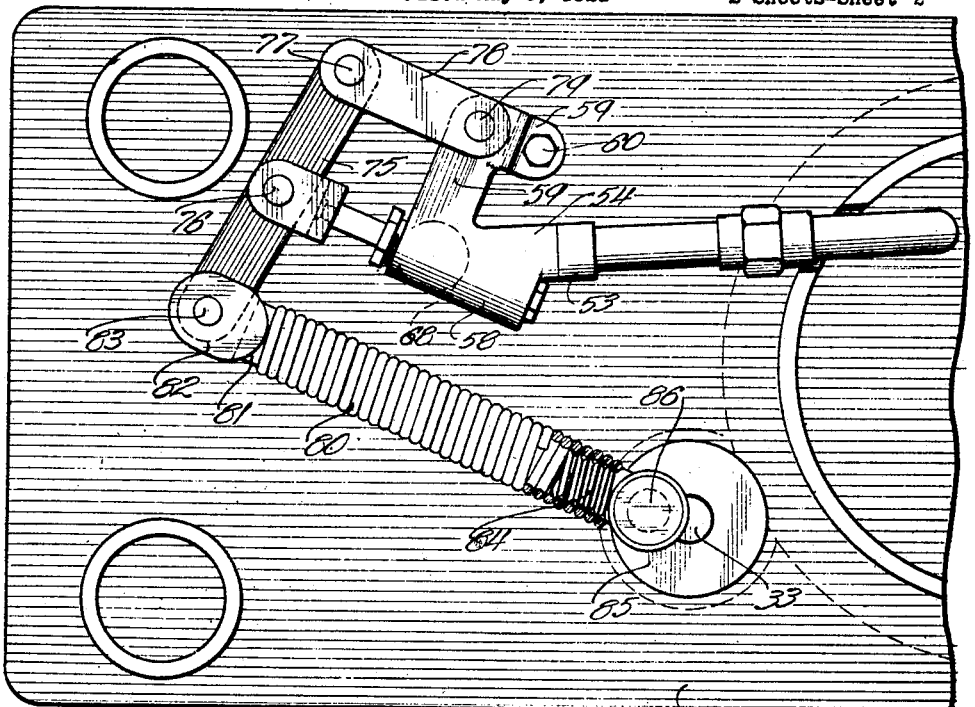
Fig.3
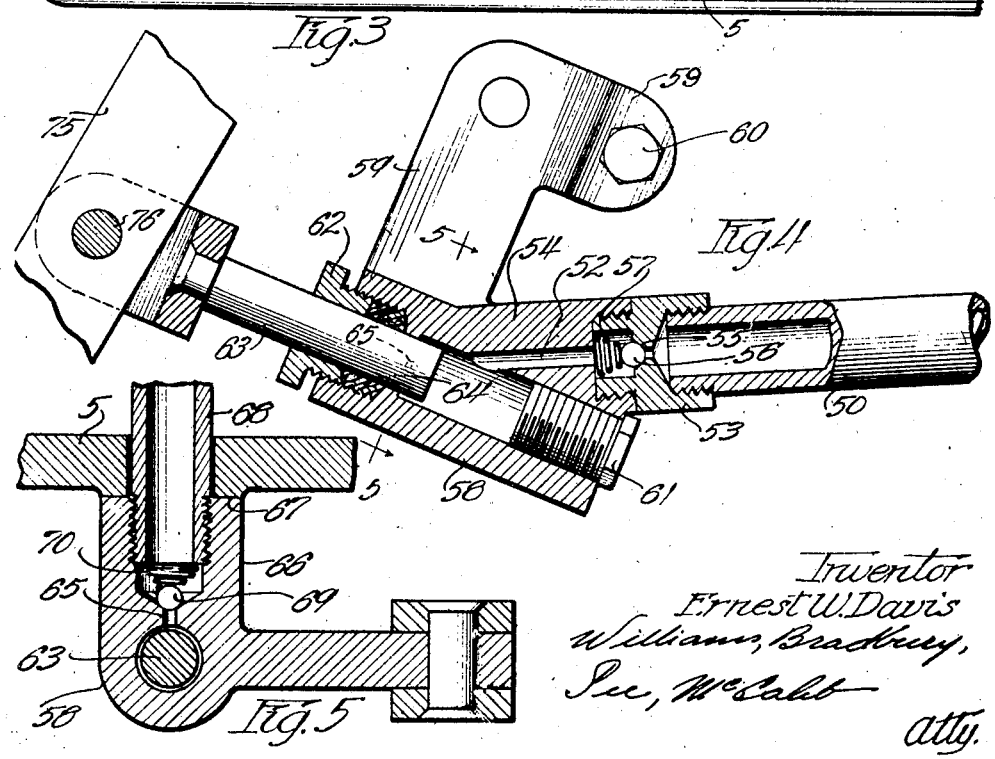
Fig.4
Fig.5
Inventor
Ernest W. Davis
Williams, Bradbury,
Sue, McCaleb
atty.

Patented Oct. 20, 1925.

1,558,244

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICANT COMPRESSOR.

Application filed May 6, 1921. Serial No. 467,264.

*To all whom it may concern:*

Be it known that I, ERNEST W. DAVIS, a citizen of the United States, and resident of Oak Park, in the county of Cook and State of Illinois, have invented certain new and useful Improvements in Lubricant Compressors, of which the following is a full, clear, concise, and exact description, reference being had to the accompanying drawings, forming a part of this specification.

My invention relates to improvements in lubricant compressors, and is particularly concerned with the provision of a power-operated compressor for supplying lubricant under pressure to any desired point.

My invention is particularly adapted to form a part of a lubricating system comprising a plurality of nipples adapted to be secured to the bearings to be lubricated and a compressor having a discharge conduit provided with a coupling which can be successively attached to and detached from the nipples for the purpose of supplying lubricant thereto under pressure.

The objects of my invention are:—

First; to provide a compressor capable of holding a comparatively large supply of lubricant and means for placing the lubricant under pressure sufficient to force the lubricant to the point or points desired.

Second; to provide a compressor of the character described so constructed that it can be quickly and easily filled with lubricant.

Third; to provide a compressor driven by a motor, the connections between the compressor and the motor being such that the motor can continue to operate continuously while the pressure on the lubricant is maintained substantially constant even though no lubricant is being discharged from the compressor.

Fourth; to provide a compressor of the character described in which the driving connections between the motor and the member which exerts pressure upon the lubricant, are such that while the pressure can be efficiently applied to the lubricant, the reaction of this pressure in the direction of the motor will not have any injurious effect upon the motor.

Fifth; to provide a compressor of the character described in which the driving connections between the motor and the compressor proper comprise a yieldable member which will absorb the power of the motor when the pressure upon the lubricant has reached a predetermined degree.

Sixth; to provide a power-driven compressor in which the connections between the motor and compressor proper include a spring so connected that it will transmit the power of the motor to the lubricant until the lubricant is placed under a predetermined pressure, after which the spring itself will absorb the power of the motor.

Seventh; to provide a power-operated compressor of the character last described wherein means are provided for preventing the spring upon resuming its untensioned condition from communicating its power to the motor.

Eighth; to provide a lubricant compressor comprising a high pressure cylinder and a low pressure cylinder, the low pressure cylinder of which supplies lubricant to the high pressure cylinder, and finally Ninth; to provide a lubricant compressor of the character described in which both cylinders are provided with plungers driven from a single motor, the driving connections between the motor and the plungers being of such character that the motor can continue to run after the lubricant in the two cylinders has reached a certain predetermined pressure without increasing the pressure upon the lubricant, and without injury to the motor.

Other objects will appear as this description progresses, reference being had to the accompanying drawings, in which—

Figure 1 is a plan view of my improved compressor;

Figure 2 is a side elevation, partially in section, showing certain details of construction thereof;

Figure 3 is a bottom view thereof;

Figure 4 is an enlarged sectional detail showing certain details of construction of the high pressure pump forming a part of my compressor, and Figure 5 is a sectional detail taken on line 5—5 of Figure 4.

Throughout the several views, similar reference characters will be used for referring to similar parts.

I prefer to mount the compressor which I am about to describe upon a platform 5 which is portably mounted upon a plurality of casters 6 and which may be drawn from place to place as desired by means of the tongue 7 and handle 8. The platform 5 is provided with an opening 9 for receiving the base casting or lower end closure 10 of the low pressure cylinder 11, this casting being secured to the platform by means of bolts 12 or in any other suitable manner. A ring 13 is screw-threaded or otherwise secured to the upper end of the barrel 11 and supports the two vertical pins 14 and 15. The first of these pins acts as a pivot pin for the cap 16, this cap being provided with a suitable bearing 17 for receiving the pin 14. The pin 15 acts as a stop to properly position the cap 16 with relation to the barrel 11 and for this purpose the cap is provided with a lateral extension 18 which is provided with longitudinally extending slot 19, see Fig. 1, adapted to receive the pin 15.

A plunger comprising the cup-leather 21, the face plate 22 and the follower-plate 23 is slidable in the low pressure cylinder 11 and secured to the inner reduced end portion 24 of the screw-threaded plunger rod 25. The plunger rod 25 extends through a correspondingly threaded opening 26 in the end of the cap 16 and is provided at its outer end with a handle 27 by means of which it can be manually rotated.

A recess 28 is formed in the inner side of the cap 16 which is of sufficient size to receive the plunger, when the plunger rod 25 is rotated to move the plunger to the upper limit of its stroke. When this is done, the cap 16 can be rotated about the pin 14 as an axis so as to completely uncover the upper end of the low pressure cylinder 11 to facilitate the filling of the same. The inner side of the ring 13 is beveled as shown at 29 to compress the flange of the cup-leather 21 and guide it into the low pressure cylinder after the low pressure cylinder has been filled and the cap has been replaced in registry with the low pressure cylinder.

Power for operating the plunger may be obtained from a motor M which is secured to the platform 5 and which I have here illustrated as being an electric motor, although my invention is not limited to the use of any particular type of motor. The shaft 30 of the motor drives a worm 31 which, in turn, drives the worm gear 32. The worm gear 32 is rigidly secured to the vertical shaft 33, the upper end of which rotates in a bearing 34 formed integrally with the ring 13. The lower end of the shaft 33, the worm 31 and the worm gear 32 find suitable bearings and are housed in a casing 35 which is secured to one side of the low pressure cylinder 11.

A ratchet gear 36 is mounted upon the upper side of the cap 16 and provided with a central opening through which the plunger rod 25 projects. A longitudinally extending slot 37 is formed in one side of the plunger rod 25 for receiving one edge of a spline 38, the other edge of which is secured in a corresponding slot in the ratchet gear 36. By this construction, any rotation of the ratchet gear 36 is transmitted to the plunger rod 25 but by reason of the spline connection between the ratchet gear and the plunger rod, the plunger rod can move longitudinally with respect to the ratchet gear.

One end of the crank or lever 40 is provided with an upper portion 41 which is rotatably mounted upon the upwardly extending cylindrical projection 42 of the ratchet gear 36. The other end of the crank or lever 40 is connected with the crank pin 43, secured to the upper end of the shaft 33, by means of a tension spring 44, the opposite ends of this spring being pivotally secured to the pin 43 and the free end of the crank 40 respectively. A pawl 45 is provided with a shaft 46 which extends through the crank 40 and is provided at its upper end with a handle 47 by means of which the pawl 45 can be released from the teeth of the ratchet gear 36. A spring 48, the central portion of which is wrapped about the shaft 46 and the opposite ends of which bear against the the handle 47 and a pin carried by the crank 40, respectively, provide means for yieldingly holding the pawl 45 in engagement with the teeth of the ratchet gear.

A pipe 50 connects the lower end of the low pressure cylinder 11 with the intake port 52 of the high pressure pump forming a part of my compressor, there being a suitable union 53 interposed between the end of the pipe 50 and the boss 54, through which the intake 52 passes. The union is provided with a valve seat 55, with which the valve 56 co-acts, to prevent the return of lubricant through the pipe 50 to the low pressure cylinder. The valve 56 is yieldingly held on its seat by a compression spring 57.

The cylinder 58 of my pressure pump is secured to the base plate or platform 5 by means of the bracket 59, and the bolt 60. One end of the cylinder is closed by a suitable plug 61, and the other end thereof is provided with a suitable bushing 62 in which is slidably mounted the plunger 63. A suitable packing 64 renders the joint between the bushing 62 and the plunger 63 fluid-tight. It will be noted from an inspection of Figures 4 and 5 that the diameter of the plunger 63 is somewhat less than the diameter of the bore of the cylinder 58. This enables me to have both the intake port 52 and the discharge port 65 enter the cylinder at the one end of the cylinder, thereby rendering the apparatus somewhat more compact. The discharge port 65 communicates with a hollow boss 66, the upper end of which contacts with an annular boss 67, formed on the lower side of the platform 5. A discharge standpipe 68 is threaded into the open end of the boss 66, and a non-return valve 69 prevents reverse flow of lubricant into the high pressure cylinder, the valve 69 being held upon its seat by compression spring 70.

I prefer to connect one end of a flexible hose 71 to the upper end of the standpipe and to provide the free end of this hose with a coupling, not shown, but similar to that illustrated and described in my co-pending application, Serial No. 386,153, filed June 3, 1920; or a coupling of the usual type can be used in combination with means for controlling the flow of lubricant through the discharge conduit such as disclosed in my co-pending application, Serial No. 420,157, filed October 28, 1920.

For actuating the plunger 63 I provide the lever 75, one end of which is pivoted intermediate its ends as shown at 76 to the outer end of the plunger 63. One end of the lever 75 is pivotally secured as shown at 77, to one end of a pair of links 78, the opposite ends of which are pivotally mounted upon the bracket 59 as shown at 79.

The tension spring 80 is provided at one end with a coupling member comprising a screw-threaded plug 81 which is screwed into the end of the spring 80. The opposite end of the plug is bifurcated to form two ears 82, which are pivotally secured to the free end of the lever 75 as shown at 83. A screw-threaded plug 84 is screwed into the opposite end of the spring 80, and its free end is secured to the disk 85 carried by the lower end of the shaft 33 which projects through the platform 5, eccentrically of the shaft 33 by means of a suitable crank pin 86. The crank pins 43 and 86 are so disposed relatively to each other and to the direction of the pull upon the springs 44 and 80 that when one of the springs is being tensioned, the other is being relaxed. In this manner, the two springs tend to counter-balance each other to prevent undue variations of load being placed upon the motor.

When substantially all of the lubricant has been discharged from the low pressure cylinder 11 and the plunger occupies substantially the position shown in Figure 2, and it is desired to refill the low pressure cylinder, the operator releases the pawl 45 from the ratchet gear and then rotates the shaft 25 by means of the handle 27 to bring the plunger up into the recess 28. The thumb screw 20 is then released and the cap 16 swung to one side. The low pressure cylinder can then be filled to a level just below the top of the ring 13, whereupon the cap 16 is returned to its original position and the set screw 20 secured. The operator then grasps the handle 27 and by rotating it in a direction opposite to that before, brings the plunger into contact with the lubricant. The motor can then be started, whereupon the shaft 33 will rotate and the crank pin 43 will move in a circle about the axis of the shaft 33. The tension of the spring 44 is such that at the beginning it will not be flexed but will communicate the movement of the pin 43 undiminished to the end of the crank or lever 40, thereby causing the crank and the pawl 45 to move in a direction to cause the pawl 45 to engage the teeth of the ratchet gear 36 and rotate this gear and the plunger 25 splined thereto. Upon the return stroke of the pin 43 the tension spring 44 will act as a solid rod and thus cause the free end of the crank 40 to move in the opposite direction. The pawl 45 will thus be caused to slide over the teeth of the gear 36 without moving it or the attached plunger rod. This operation will be continued until the force necessary to be exerted on the free end of the lever 40 to produce further pressure upon the lubricant, becomes so great that the spring 44 stretches or flexes during the outward movement of the crank pin 43. When this pressure has been reached, it will remain substantially constant, even though the motor continues to operate and it is immaterial whether lubricant is being withdrawn from the low pressure cylinder 11 or not.

In this manner, the motor can continue to operate without imposing an undue load upon it, and there is no danger of any portion of the compressor being damaged or destroyed by undue pressure set up in the low pressure cylinder or tensions created in the operating portions thereof.

When the pressure on the lubricant has reached such a degree that the spring is alternately flexed and released, there will be a tendency for the spring 44 upon its untensioning or releasing stroke, to communicate its power to the motor shaft and thus accelerate the motor. This action is, however, effectually prevented by the worm and gear connection between the motor and the shaft 33, the pitch of the worm threads and the worm wheel teeth being such as to prevent any torque exerted upon the shaft 33 from being transmitted to the shaft 30 of the motor.

Whenever lubricant is withdrawn from the compressor so as to reduce the pressure below the maximum pressure determined by the tension of the spring 44, this spring will cease to flex and will again act to transmit the power from the motor to the end of the crank 40 whereupon the plunger will be moved downwardly thus tending to keep the pressure on the lubricant constant.

The lubricant discharged from the low pressure cylinder 11 passes into the high pressure cylinder 58, from which it is in turn displaced by the plunger 63, out through the standpipe 68 and the flexible discharge conduit 71. By making the diameter of the plunger 63 comparatively small, a very high pressure exceeding, in fact, one thousand pounds per square inch, can be obtained without requiring a very large motor. Whenever the flow of lubricant through the flexible discharge conduit is interrupted, the pressure in the high pressure cylinder will build up to a point where the tension of the spring 80 is no longer sufficient to move the plunger 63 against the resistance of the lubricant, and the spring 80 will be alternately flexed and relaxed just as described above in connection with the low pressure cylinder 11. There will therefore be a predetermined maximum pressure which can be exerted upon the lubricant in the discharge conduit, which pressure will be determined by the strength of the spring 80.

While I have described the details of construction of the preferred embodiment of my invention, it is to be clearly understood that my invention is not limited to these details, but is capable of other adaptations and modifications coming within the scope of the appended claims.

Having thus described my invention, what I claim is:

1. A lubricant compressor comprising a low pressure cylinder, a plunger slidable in said low pressure cylinder, a cap for said low pressure cylinder, the end of said cap having a screw-threaded opening therethrough, a screw-threaded plunger rod extending through said threaded opening and carrying said plunger at its inner end, a ratchet gear for rotating said plunger rod, a crank arm, a pawl secured to said crank arm for engaging said ratchet, means for oscillating said crank arm comprising a shaft mounted parallel with said plunger rod, a spring having one end connected with the free end of said crank arm, and the other end connected to said shaft eccentrically thereof, a high pressure cylinder having a plunger reciprocable therein, a lever for operating said plunger, and a second spring having one end connected to said lever and the other end connected to said shaft eccentrically thereof, the points of connection of said springs to said shaft being such that when one spring is being tensioned the other is being relaxed.

2. A lubricant compressor comprising a low pressure cylinder, a plunger slidable in said low pressure cylinder, a cap for said low pressure cylinder, the end of said cap having a screw-threaded opening therethrough, a screw-threaded plunger rod extending through said threaded opening and carrying said plunger at its inner end, a ratchet gear for rotating said plunger rod, a crank arm, a pawl secured to said crank arm for engaging said ratchet, means for oscillating said crank arm comprising a shaft, a spring having one end connected with the free end of said crank arm, and the other end connected to said shaft eccentrically thereof, a high pressure cylinder having a plunger reciprocable therein, a lever for operating said plunger, and a second spring having one end connected to said lever and the other end connected to said shaft eccentrically thereof.

3. A lubricant compressor comprising a low pressure cylinder and a high pressure cylinder, a plunger in said low pressure cylinder, a screw-threaded plunger rod carrying said plunger, a plunger in said high pressure cylinder, a motor, driving connections between said motor and said plunger rod for intermittently advancing said first-named plunger, and driving connections between said motor and said second-named plunger for reciprocating said second-named plunger.

4. A lubricant compressor comprising a low pressure cylinder, a high pressure cylinder, a plunger in each of said cylinders, a motor, a driving connection between said motor and each of said plungers comprising a yieldable member, said yieldable members being connected with said motor in counterbalanced relation.

In witness whereof, I hereunto subscribe my name this 3rd day of May, 1921.

ERNEST W. DAVIS.